United States Patent [19]

Trinks et al.

[11] Patent Number: 5,349,040
[45] Date of Patent: Sep. 20, 1994

[54] TWO-COMPONENT POLYURETHANE ADHESIVES

[75] Inventors: Rainer Trinks, Dormagen; Heinrich Königshofen, Bergisch Gladbach; Otto Ganster, Odenthal; Horst Stepanski, Leverkusen; Jose Colinas-Martinez, Wermelskirchen, all of Fed. Rep. of Germany

[73] Assignee: Bayer Aktiengesellschaft, Leverkusen, Fed. Rep. of Germany

[21] Appl. No.: 776,517

[22] Filed: Oct. 11, 1991

[30] Foreign Application Priority Data

Oct. 19, 1990 [DE] Fed. Rep. of Germany ....... 4033221

[51] Int. Cl.$^5$ ............................................. C08G 18/67
[52] U.S. Cl. .......................................... 528/75; 528/68; 528/85; 528/905; 521/155; 521/163; 521/170; 521/173; 521/174; 521/905
[58] Field of Search ............... 528/75, 68, 85, 905; 521/155, 163, 170, 173, 174, 271, 422, 905

[56] References Cited

U.S. PATENT DOCUMENTS

| | | | |
|---|---|---|---|
| 3,274,160 | 9/1966 | Ellegast et al. | 528/60 |
| 3,558,529 | 1/1971 | Whitman et al. | 528/77 |
| 3,577,295 | 5/1971 | Kraft et al. | 156/177 |
| 3,591,561 | 7/1971 | Kazama et al. | 528/59 |
| 3,714,124 | 1/1973 | Hunsucker | 528/243 |
| 3,725,355 | 4/1973 | Parrish et al. | 528/55 |
| 3,945,939 | 3/1976 | Barron | 252/182 |
| 4,211,683 | 7/1980 | Wenzel et al. | 528/59 |
| 4,336,298 | 6/1982 | Schwarz | 428/285 |
| 4,413,111 | 11/1983 | Markusch et al. | 528/59 |
| 4,568,717 | 2/1986 | Speranza et al. | 524/762 |
| 4,628,092 | 12/1986 | Takahashi et al. | 544/351 |
| 4,673,696 | 6/1987 | Tsai | 521/172 |
| 4,716,182 | 12/1987 | Hess et al. | 528/78 |
| 4,954,199 | 9/1990 | Rains et al. | 156/331.7 |

FOREIGN PATENT DOCUMENTS

| | | |
|---|---|---|
| 255930 | 2/1988 | European Pat. Off. . |
| 2273608 | 2/1976 | France . |
| 776979 | 6/1957 | United Kingdom . |
| 1317949 | 5/1973 | United Kingdom . |

*Primary Examiner*—John Kight, III
*Assistant Examiner*—Duc Truong
*Attorney, Agent, or Firm*—Joseph C. Gil; Godfried R. Akorli

[57] ABSTRACT

Disclosed herein is a two-component polyurethane adhesive containing an isocyanate component a), an active hydrogen containing component which is stable against demixing b), optionally a catalyst for the reaction of a) with b) and optionally an auxiliary agent and an additive, characterized in that an active hydrogen containing component which is stable against demixing b) contains at least one hydroxyl group-containing low molecular weight chain lengthening agent having at least one C-C double bond or C-C triple bond and having a molecular weight of at least 86 and a functionality of at least 2 and containing no carboxyl groups.

4 Claims, No Drawings

TWO-COMPONENT POLYURETHANE ADHESIVES

BACKGROUND OF THE INVENTION

This invention relates to compatible storage-stable mixtures containing relatively high molecular weight polyhydroxyl compounds and short chained polyols and to their use for the preparation of the polyurethanes. The invention also relates to the use of these storage-stable mixtures in two-component polyurethane adhesives.

It is known from DE-B-1,770,703 to use incompatible polyols for the preparation of polyurethane mixtures. End products having improved properties such as, for example, good heat resistance and high impact strength, are obtainable by these means.

However, the use of a mixture of incompatible polyols has various disadvantages with regard to storage and processing. Even a brief period of storage, i.e. several hours to 3 days, of thoroughly mixed polyol systems results in separation of the mixture into two phases. Thus the polyol mixtures must be intensively mixed each time before they are filled into containers or they must be continuously mixed or kept in circulation to ensure that the ratio of components in the mixture will be kept constant.

Various methods have become known for stabilizing the phases of such mixtures.

According to the teaching of U.S. Pat. No. 3,945,939, for example, the phases may be sedimented by the addition of colloidal silica or a clay which has been modified with an onium compound. DE-A 2,341,294 similarly teaches the use of inert, surface-active materials having a specific surface area of from 10 to 800 m²/g, such as a silica agglomerate and/or a chrysotile asbestos and/or an inorganic material similar to chrysotile asbestos in its mineral structure.

Another possibility of homogenizing several polyols which are incompatible with one another comprises of adding liquid or soluble solubilizing agents. Thus, according to U.S. Pat. No. 4,141,952, mixtures of monomeric polyols having a molar mass of <500 and polyether polyols having a molar mass of from 1800 to 7000 are prevented from separating by using so-called graft polypropylene ether glycols in the molar mass range of from 1500 to 3500.

A stable emulsion of a high molecular weight polyol and ethylene glycol or butanediol-(1,4) is prepared according to U.S. Pat. No. 4,273,884 by adding an ethylene oxide/propylene oxide copolymer (molar mass 12,000).

Mixtures of poly(oxypropylene/oxyethylene) polyols (OH number 20 to 60) having certain oxyethylene contents with ethylene glycol or butanediol are described in DE-B 2,759,398. The polyols used must contain from 10 to 30% by weight of oxyethylene end groups and from 5 to 60% by weight of inner oxyethylene groups. The polyols should preferably contain as much inner ethylene oxide as possible.

According to U.S. Pat. No.-B 471,405, mixtures of high molecular weight polyoxyalkylene polyols having OH equivalent weights of from 650 to 3000 and ethylene glycol, for example, are prevented from separating by means of soluble diol compounds such as 1,2-butylene glycol, di-(1,2-butylene glycol), di-(1,2-propylene glycol) and tri-(1,2-propylene glycol).

It is also known to one skilled in the art that diphasic mixtures of incompatible polyols may be stabilized as a single phase by the addition of emulsifiers such as long chain benzene alkyl sulphonates, etc.

None of these teachings of the prior art it completely satisfactory. The use of solids as emulsion stabilizers is liable to cause abrasion of the dosing and mixing apparatus and the stabilizing effect generally diminishes sharply after only a few days. Moreover, there are objections to the use of materials containing asbestos on physiological grounds. When surface-active substances are used it is necessary to take into account their intrinsic catalytic activities, in particular when charged with onium compounds.

The use of so-called "graft polyols" proposed in U.S. Pat. No. 4,141,852 has the disadvantage in that "graft polyols" are expensive compared with ungrafted polyols, thus rendering the process less economical.

The teaching of U.S. Pat. No. 4,273,884 also fails to satisfy the demand for a single phase, storage-stable polyol mixture since the emulsions which can be prepared thereby show signs of at least partial phase separation within the first 6-8 weeks. The above Patent Specification merely maintains that "fairly stable" emulsions are obtained.

Although such monophasic stable polyol mixtures can be produced by means of di- and tripropylene glycols according to U.S. Pat. No. 471,405, it is well known to one skilled in the art that the addition of these compounds results in a severe deterioration in the mechanical properties of the polyurethane parts produced, in particular a loss of dimensional stability under heat.

The use of conventional emulsifiers for obtaining a single phase polyol mixtures has numerous disadvantages. The emulsifiers are liable to separate as crystals from the polyol mixture in the course of time or they may, for example, accumulate on the surface, and may alter the catalytic balance of the system in an uncontrollable manner and may bleed out of the polyurethane parts and hence drastically impair its use properties.

There is, therefore still an urgent technical need for polyol or polyol-polyamine formulations which are stable in storage for a sufficient period of time, have a high hydroxyl number of the mixture, possibly a high hydroxyl/amine number, and optionally also contain a high proportion of preferably low molecular weight chain lengthening agents.

DE-A 3,219,759 teaches that the compatibility of (i) relatively high molecular weight polyoxyalkylene polyols in the OH number range of from 20 to 210 containing at least 5% by weight of predominantly terminal oxyethylene segments with (ii) ethylene glycol may be established by modifying ethylene glycol with from 0.1 to 0.5 mol of propylene oxide per mol of ethylene glycol.

DE-A 3,219,822 (=EP-A-0,095,635) teaches that the compatibility produced by the propoxylation of ethylene glycol (and/or of 1,4-butanediol, which may also be used as a low molecular weight diol) may be enhanced by incorporating in the mixtures certain ammonium or metal salts of the type also used according to the invention.

EP-0,150,427 describes the use of potassium salts as compatibility imparting agents. The salts proposed include inter alia the product of addition of potassium hydrogen sulphite to 2-cis-butenediol-(1,4) followed by a reaction with propylene oxide as solubilizing agent. It does not teach the use of 2-cis-butenediol-(1,4) itself as solubilizing agent.

U.S. Pat. No. 4,786,435 describes the use of phenols as compatibility imparting agents for RIM systems.

U.S. Pat. No. 4,839,087 teaches the use of urethanes as compatibility imparting agents for RIM systems. U.S. Pat. No. 4,673,696 describes the use of unsaturated esterols such as fumaric acid or maleic acid esters as compatibility imparting agents. It teaches their use in RIM systems. EP-A 0,341,375 describes the use of mixtures of polyoxypropylenetriols in storage-stable RIM systems. The mixtures may be free from polyoxyethylene contents in the polyether.

U.S. Pat. No. 4,385,133 describes compatible mixtures of glycols and propylene oxide/ethylene oxide polyols requiring a high minimum proportion of ethylene oxide groups. The mixtures may be used in RIM systems. U.S. Pat. No. 4,319,973 describes polyurethane elastomers which are prepared using storage-stable mixtures of certain polymer polyols with glycols. Their use is limited to certain ethylene oxide contents and certain compositions of the polymer polyols.

U.S. Pat. No. 4,576,731 describes mixtures of polyols whose compatibility is improved by a reaction with isocyanates.

Two-component polyurethane adhesives have long been known. U.S. Pat. No. 3,274,160 describes reaction products of polyisocyanates with a mixture which has alcoholic hydroxyl functions. U.S. Pat. No. 3,591,561 and 3,725,355 describe the preparation of polyurethane elastomers. In the former case, a lactone polyester polyol and a low molecular weight diol are reacted with an organic diisocyanate and cross-linked by means of a diamine or polyol such as glycerol. In the latter case, the polyurethane elastomer is obtained from a polyether polyol, a chain-lengthening agent and an isocyanate prepolymer with the aid of a tin catalyst. U.S. Pat. No. 3,577,295 describes polyurethane elastomers for driving belts, using polyol mixtures containing polymers of unsaturated monomers, organic polyisocyanates and amines as hardeners. U.S. Pat. No. 4,182,898 describes polyurethanes of polyester polyol prepolymers which are reacted with diisocyanates together with low molecular weight polyols. U.S. Pat. No. 4,193,832 describes the reaction of polyisocyanates with isocyanate-reactive hydrogen in which tertiary amines may function as catalysts. A process of preparation of polyurethane adhesives using excess diisocyanates, polyols and optionally chain lengthening agents such as, for example, amines is described in U.S. Pat. No. 4,156,064. The use of amines for rendering adhesives non-sagging is particularly described in U.S. Pat. No. 3,979,364, 4,336,298 and 4,444,976 and in EP-A-63,534.

U.S. Pat. No. 4,487,909 describes an adhesive based on a polyol, e.g. a polyether polyol, and glycerol as branching agent. U.S. Pat. No. 4,530,941 describes a RIM polyurethane mixture composed of a high molecular weight polyol, a chain lengthening agent, a polyoxyalkylene having amino end groups and a polyisocyanate. U.S. Pat. No. 4,554,340 describes the polyol mixture for the preparation of polyurethanes from high molecular weight polyalkylene oxide and low molecular weight diol and optionally also isocyanate reactive compounds such as glycerol and diamine. U.S. Pat. No. 4,568,717 described the preparation of polyols from organic polyisocyanates with a terephthalic acid polyester polyol.

U.S. Pat. No. 3,714,127 describes two-component polyurethane adhesives based on an isocyanate prepolymer to which an amine is added for increasing the viscosity and to ensure non-sagging.

EP-A-0,068,209 describes a two-component polyurethane adhesive having a polyol component containing a polyester or polyether triol, a phenylene diamine and a tin catalyst. This mixture is reacted with an aromatic diisocyanate.

EP-A-248,254 describes a two-component polyurethane adhesive which is a reaction product of a hydroxyl functional material, a di- or triamine and an organic isocyanate. The adhesives prepared by this method are distinguished by outstanding properties but do not satisfy all demands as regards stability of the polyol component in storage.

It is therefore an object of the present invention to provide compatible mixtures of relatively high molecular weight polyhydroxyl compounds and short-chained polyols and polyamines which constitute efficient two-component adhesive systems when mixed with isocyanates.

SUMMARY OF THE INVENTION

The present invention relates to a two-component polyurethane adhesive containing an isocyanate component a), containing active hydrogen b) and optionally a catalyst for the reaction of a) with b) and optionally auxiliary agents and additives, characterized in that an active hydrogen containing component which is stable against demixing b) contains at least one hydroxyl group-containing low molecular weight chain lengthening agent which has at least one C—C double bond or a C—C triple bond, has a molecular weight of at least 86 and a functionality of at least 2 and is free from carboxyl groups.

In a preferred embodiment, component b) contains
b1) 100 parts by weight of at least one hydroxyl group-containing compound having a molecular weight of at least 400 and a hydroxyl functionality of at least 2,
b2) from 2–20 parts by weight of at least one aliphatic, aromatic or cycloaliphatic diamine or triamine having a molecular weight of at least 60,
b3) from 5–40 parts by weight of at least one hydroxyl group-containing low molecular weight chain lengthening agent having at least one C—C double bond or C—C triple bond and having a molecular weight of at least 86 and a functionality of at least 2 and containing no carboxyl groups,
b4) from 0–35 parts by weight of at least one hydroxyl group-containing, low molecular weight chain lengthening agent having a molecular weight of at least 62 and a functionality of at least 2.

In a preferred embodiment, components a) and b) in addition contain conventional auxiliary agents and additives. In a particular preferred embodiment, component b) contains a catalyst. The catalyst is preferably used in such a quantity that component b) contains at least 0.005 g of tertiary amine nitrogen per 100 g, taking into account the tertiary nitrogen possibly present as component b1).

DETAILED DESCRIPTION OF THE INVENTION

The isocyanate components used are mainly compounds corresponding to the following formula

$Q\ (NCO)_n,$ in which n=2–4, preferably 2, and Q denotes an aliphatic hydrocarbon group having 2–18, preferably 6–10 carbon atoms, a cycloaliphatic hydrocarbon group having 4–15, preferably 5–10 carbon atoms, an aromatic hydrocarbon group having 6–15, preferably 6–13 carbon atoms, or an araliphatic hydrocarbon group having 8–15, preferably 8–13 carbon atoms.

The following polyisocyanates are particularly preferred: hexamethylene diisocyanate, 1,12-dodecanediisocyanate, cyclobutane-1,3-diisocyanate, cyclohexane-1,3-and -1,4-diisocyanate and any mixtures of these isomers, 1-isocyanato-3,3,5-trimethyl-5-isocyanatomethylcyclohexane, hexahydro-1,3- and/or -1,4-phenylenediisocyanate, perhydro-2,4'- and/or 4,4'-diphenylmethanediisocyanate, 1,3-and 1,4-phenylenediisocyanate, 2,4- and 2,6-tolylenediisocyanate and any mixtures of these isomers, diphenylmethane-2,4'-and/or 4,4'-diisocyanate, naphthylene-1,5-diisocyanate, triphenylmethane-4,4', 4''-triisocyanate and polyphenyl-polymethylene polyisocyanates which are obtainable by aniline-formaldehyde condensation followed by phosgenation.

Examples of suitable relatively high molecular weight polyisocyanates include modification products of such simple polyisocyanates, i.e. polyisocyanates having, for example, isocyanurate, carbodiimide, allophanate, biuret or uretdione structural units, such as may be obtained by processes known in the art from the above exemplified simple polyisocyanates corresponding to the above general formula. Among the relatively high molecular weight modified polyisocyanates, the prepolymers known from polyurethane chemistry which have isocyanate end groups and molecular weights in the range of from 400 to 10,000, preferably from 600 to 8000 and especially from 800 to 5000, are of particular interest. These compounds are prepared in known manner by the reaction of excess quantities of simple polyisocyanates of the type exemplified above with organic compounds having at least two isocyanate reactive groups, in particular organic polyhydroxyl compounds. Suitable polyhydroxyl compounds of this type include both simple polyhydric alcohols in the molecular weight range of from 62 to 599, preferably from 62 to 200, e.g. ethylene glycol, trimethylolpropane, propane-1,2-diol, butane-1,4-diol or butane-2,3-diol but especially relatively high molecular weight polyether polyols and/or polyester polyols of the type known from polyurethane chemistry having molecular weights of from 600 to 8000, preferably from 800 to 4000, and containing at least two, generally 2 to 8, preferably 2 to 4 primary and/or secondary hydroxyl groups. Isocyanate prepolymers prepared, for example, from low molecular weight polyisocyanates of the type exemplified above and less preferred compounds having isocyanate reactive groups, such as polythioether polyols, hydroxyl group-containing polyacetals, polyhydroxy polycarbonates, hydroxyl group-containing polyester amides or hydroxyl group-containing copolymers of olefinically unsaturated compounds may, of course, also be used. Compounds containing active hydrogen, in particular hydroxyl groups, suitable for the preparation of the isocyanate prepolymers include, for example, the compounds disclosed by way of example in U.S. Pat. No. 4,218,543, column 7, line 29 to column g, line 25. For the preparation of the isocyanate prepolymers, these compounds containing active hydrogen are reacted with simple polyisocyanates of the type exemplified above at NCO/OH equivalent ratios of about 1.5:1 to 20:1, preferably from 5:1 to 15:1. The isocyanate prepolymers generally have an isocyanate content of from 2.5 to 25% by weight, preferably from 6 to 22% by weight. This shows that the terms "isocyanate prepolymers" and "prepolymers having isocyanate end groups" used in the context of this invention include both the reaction products as such and mixtures thereof with excess quantities of unreacted starting polyisocyanates, frequently referred to as "semiprepolymers".

Polyisocyanate components al ) particularly preferred for the process according to the invention are the commercial polyisocyanates conventionally used in polyurethane chemistry, i.e. hexamethylene diisocyanate, 1-isocyanato-3,3,5-trimethyl-5-isocyanatomethylcyclohexane (isophorone diisocyanate, abbreviated: IPDI), 4,4'-diisocyanato-dicyclohexylmethane, 2,4-diisocyanato-toluene, commercial mixtures thereof with 2,6-diisocyanatotoluene, 4,4'-diisocyanatodiphenylmethane, mixtures thereof with the corresponding 2,4'- and 2,2'-isomers, polyisocyanate mixtures of the diphenylmethane series which may be prepared in known manner by the phosgenation of aniline/formaldehyde condensates, modification products of these commercial polyisocyanates containing biuret or isocyanurate groups, and in particular isocyanate prepolymers of the above mentioned type based on these commercial polyisocyanates on the one hand and the simple polyols and/or polyether polyols and/or polyester polyols exemplified above on the other hand, and any mixtures of such polyisocyanates.

Auxiliary agents and additives optionally used may include, for example, fillers, dyes, zeolites and pigments.

The following are examples of fillers, in particular fillers which have a reinforcing action: Silicate type minerals, for example, lameller silicates such as antigorite, serpentine, horn blendes, amphibolites, chrysotile and talc; metal oxides such as kaolin, aluminum oxides, titanium oxides and iron oxides; metal salts such as chalk, heavy spar and inorganic pigments such as cadmium sulphide or zinc sulphide; and glass, powdered asbestos, etc. Natural and synthetic fibrous materials are preferably used, such as asbestos, wollastonite and in particular glass fibers of various lengths which may or may not be sized. The fillers may be used singly or as mixtures. If fillers are used, they are advantageously added to the reaction mixture in quantities of up to 50% by weight, preferably up to 30% by weight, based on the weight of components a) and b).

Further details concerning conventional auxiliary agents and additives may be found in the technical literature, for example the monograph by J. H. Saunders and K. C. Frisch, "High Polymers", Volume XVI, Polyurethanes, Parts 2 and 7, published by Interscience Publishers, 1962 and 1964.

Component b1) of the system according to the invention preferably comprise of at least one organic compound having a molecular weight of from 400 to 12,000, preferably from 400 to 6000, containing 2–8, preferably 2–5 hydroxyl functions. The molecular weights given here may be calculated from the OH number of the substance by means of the following formula:

$$\text{Molecular weight} = \frac{56{,}000}{\text{OH number}} \times \text{functionality}.$$

Suitable compounds are, for example, polyhydroxypolyethers of the type known per se from polyurethane chemistry obtainable by the alkoxylation of suitable starter molecules such as ethylene glycol, diethylene glycol, 1,4-dihydroxybutane, 1,6-dihydroxyhexane, trimethylolpropane, glycerol, pentaerythritol, sorbitol or saccharose. The following may also function as starters: Ammonia or amines such as ethylenediamine, hexamethylenediamine, 2,4-diaminotoluene, aniline or amino alcohols. The alkoxylation is carried out with propylene oxide and/or ethylene oxide in any sequence.

Polyester polyols obtainable in known manner by reaction of the low molecular weight alcohols exemplified above with polybasic carboxylic acids such as adipic acid, phthalic acid, hexahydrophthalic acid, tetrahydrophthalic acid or the anhydrides of these acids are also suitable.

Relatively high molecular weight polyhydroxypolyethers containing high molecular weight polyadducts or polycondensates or polymers in a finely dispersed or dissolved or grafted form are also suitable. Such modified polyhydroxyl compounds are obtained, for example, when polyaddition reactions (e.g. reactions between polyisocyanates and amino functional compounds) or polycondensation reactions (e.g. between formaldehyde and phenols and/or amines) are carried out in situ in the hydroxyl group-containing compounds. Such processes are described in, for example, DE-AS 1,168,075 and 1,260,142, DE-A-2,324,134, 2,423,984, 2,512,385, 2,513,815, 2,550,796, 2,550,797, 2,550,833, 2,550,862, 2,633,293 and 2,639,254. According to U.S. Pat. No. 3,869,413 and DE-A-2,550,860, such polyhydroxyl compounds may be obtained by mixing a previously prepared aqueous polymer dispersion with a polyhydroxyl compound and then removing the water from the mixture.

Polyhydroxyl compounds modified with vinyl polymers, as may be obtained, for example, by the polymerization of styrene and acrylonitrile in the presence of polyesters (U.S. Pat. No. 3,383,351, 3,304,273, 3,523,093 and 3,110,695; DE-A-1,152,536) or polycarbonate polyols (DE-PS 1,769,795; U.S. Pat. No. 3,637,909) are also suitable as component b) for the process according to the invention. Synthetic resins having exceptional flame resistance are obtained by using polyether polyols which have been modified according to DE-A-2,442,101, 2,644,922 and 2,646,141 by graft polymerization with vinyl phosphonic acid esters and optionally (meth)acrylonitrile, (meth)acrylamide or OH functional (meth)acrylic acid esters.

Representatives of the compounds to be used as compounds b1) according to the invention are described, for example, in High Polymers, Vol. XVI, "Polyurethanes, Chemistry and Technology" by Saunders-Frisch, Interscience Publishers, New York, London, Volume I, 1962, pages 32–42 and pages 44–54, and Volume II, 1964, pages 5–6 and 198–199, and in Kunststoffbin). Handbuch, Volume VII, Vieweg-Höchtlen, Carl-Hanser-Verlag, Munich, 1966, e.g. on pages 45–71.

Preferred amines b2) have a molecular weight of from 60–300. Particularly preferred are diamines such as 1,4-diaminobenzene, 2,4-diaminotoluene, 2,4'- and/or 4,4'-diaminodiphenylmethane or, preferably, polyamines having an alkyl substituent in at least one ortho-position to the amino groups, in particular diamines having at least one alkyl substituent in an ortho-position to the first amino group and two alkyl substituents, each with 1 to 3 carbon atoms, in an ortho-position to the second amino group. Particularly preferred are those which have an ethyl, n-propyl and/or isopropyl substituent in at least one ortho-position to the amino groups and optionally methyl substituents in other ortho-positions to the amino groups. These preferred or particularly preferred diamines include 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, commercial mixtures thereof with 1-methyl-3,5-diethyl-2,6-diaminobenzene, 4,6-dimethyl-2-ethyl-1,3-diaminobenzene, 3,5,3',5'-tetraethyl-4,4'-diaminodiphenylmethane, 3,5,3',5'-tetraisopropyl-4,4'-diaminodiphenylmethane and 3,5-diethyl-3',5'-diisopropyl-4,4'-diaminodiphenylmethane. Any mixtures of such aromatic diamines may also be used.

Isophorone diamine, bis-(4-aminocyclohexyl)-methane, 1,4-diaminocyclohexane, ethylenediamine and its homologues and piperazine are particularly preferred.

Preferred polyols b3) include low molecular weight, unsaturated polyhydric alcohols having a molecular weight range of from 86 to 400. The unsaturated alcohols may contain C—C double bonds and/or C—C triple bonds, examples being 3-butenediol-(1,2) and 2-butynediol-(1,4). The unsaturated alcohols may be liquid or solid at room temperature.

Diols having a symmetrical structure, such as cis-2-butenediol-(1,4); trans-2-butenediol-(1,4); 2-butynediol-(1,4); and 3-hexinediol-(2,5) are particularly preferred unsaturated alcohols. Mixtures of these compounds may also be used.

Preferred polyols b4) are low molecular weight polyhydric alcohols in the molecular weight range of from 62–400 such as the substances already mentioned under b1) as starter molecules, e.g. ethylene glycol, diethylene glycol, 1,4-dihydroxybutane, butanediol-(2,3), 1,6-dihydroxyhexane, trimethylolpropane, glycerol, pentaerythritol, sorbitol and saccharose. Polyhydric alcohols having a functionality of 2 are particularly preferred.

Compounds corresponding to the following formula are preferred catalysts:

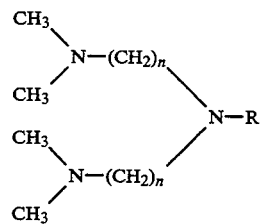

wherein n=2 or 3 and R=H, CHO or CH₃.

The following are particularly preferred catalysts:

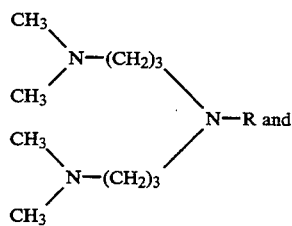

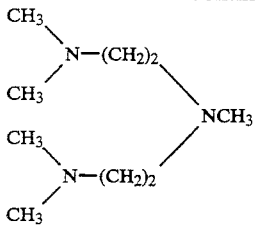

wherein R=CHO or H.

The present invention also relates to a process for gluing substances by means of the system according to the invention. The system according to the invention is suitable in particular for gluing plastics, metals, wood, stone and glass.

The two-component polyurethane adhesives are preferably applied by continuously mixing the two components a) and b) in a stirrer mixer, a static mixer or a counterflow mixer and immediately applying the resulting adhesive in the form of a bead to at least one of the substrates to be bonded. Pretreatment of the substrate surfaces by cleaning, abrading or any other treatment is frequently unnecessary. The ratios of isocyanate component to polyol component used follow the general rules of isocyanate chemistry; a slight excess of isocyanates is employed (Index range: 100–125, preferred: 100–115).

The substrates to which adhesive has been applied are placed together, fixed and either left to cure at room temperature or subjected to a curing process at elevated temperature. A bond resistant to displacement by hand can be obtained more rapidly at an elevated temperature than at room temperature.

The required open time or curing time can be varied within wide limits by the choice of curing temperature and the choice of catalyst.

Another advantage of the adhesive according to the invention is that it can be worked up solvent-free.

The subject of the invention will now be further illustrated with the aid of the following Examples (percentages are percentages by weight unless otherwise indicated). Examples Catalyst: Cat.1=tertiary amine catalyst having the following structure:

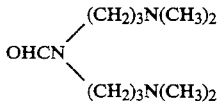

Zeolite paste:

A 50% zeolite suspension in castor oil

H12-MDA: Aliphatic diamine having the following structure

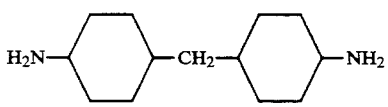

Crude MDI:4,4'-Diisocyanatodiphenylmethane mixed with its isomers and higher homologues and obtained by the phosgenation of aniline-formaldehyde condensates, NCO content 30.4%, viscosity at about 25° C.: 80 mPa.s.

Chain lengthening agent:

cis-BD=2 cis-butenediol-(1,4)
3-BD=2-butynediol-(1,4)
ges-BD=butanediol-(1,4)

Polyols:

A=trifunctional polyether polyol, 83% propylene oxide, 17% ethylene oxide end groups, [Mn] about 4800 g/mol, OH number 35 mg KOH/g B: a filler polyether is prepared analogously to Example 1 of DE-A-263,759, using, as solvent, 5077 parts by weight of a polyether polyol with OH number 35 mg KOH/g prepared by the propoxylation of trimethylolpropane and ethoxylation of the propoxylation product (PO:EO ratio: 83:17) but only 380 parts by weight of hydrazine hydrate are reacted instead of 670 parts by weight of hydrazine hydrate and only 1320 parts by weight of tolylene diisocyanate instead of 2310 parts by weight of the diisocyanate.

A polyether having an organic filler content of 20% by weight and a hydroxyl number of 28 mg KOH/g is obtained. C=A filler polyether is prepared, the "solvent" used comprising of 780 parts by weight of a polyether polyol with OH number 35 mgl KOH/g prepared by the propoxylation of trimethylolpropane and ethoxylation of the propoxylation product (PO:EO ratio=83:17). A polyether having an organic filler content of 20% by weight and a hydroxyl number of 28 mg KOH/g is obtained by radical in situ polymerization of 120 parts by weight of a mixture of acrylonitrile and styrene in a ratio by weight of 60 to 40 in the polyether.

D=difunctional polyether polyol, propylene oxide - adduct only, [Mn] about 2000 g/mol, OH number 56 mg KOH/g E=trifunctional polyether polyol, 83% propylene oxide, 17% ethylene oxide end groups, [Mn] about 6000 g/mol, OH number 28 mg KOH/g F=castor oil, OH number about 160 mg KOH/g.

The following Examples illustrate the improved compatibility of unsaturated chain lengthening agents compared with that of saturated chain lengthening agents with various polyols at room temperature.

| Example | Type of diol | Mass of diol Pts. by wt. | Type of polyol | Mass of polyol Pts. by wt. | Compatibility |
|---|---|---|---|---|---|
| 1 | cis-BD | 25 | A | 80 | homogeneous |
| * | ges-BD | 25 | A | 80 | inhomogeneous |
| 1a) | cis-BD | 40 | A | 80 | homogeneous |
| 2 | cis-BD | 25 | B | 100 | homogeneous |
| * | ges-BD | 25 | B | 100 | inhomogeneous |
| 3 | cis-BD | 25 | C | 100 | homogeneous |
| * | ges-BD | 25 | C | 100 | inhomogeneous |
| 4 | cis-BD | 25 | D | 80 | homogeneous |
| * | ges-BD | 25 | D | 80 | inhomogeneous |
| 5 | cis-BD | 25 | E | 80 | homogeneous |
| * | ges-BD | 25 | E | 80 | inhomogeneous |
| 6 | cis-BD | 15 | F | 80 | homogeneous |
| * | ges-BD | 15 | F | 80 | inhomogeneous |

\* = Comparison Examples not according to the invention.

The following Examples show that mixtures of the unsaturated chain lengthening agents with saturated chain lengthening agents also give rise to homogeneous, storage-stable mixtures with polyols.

| Ex. | Diol type 1 | Diol mass Pts. by wt. | Diol type 2 | Diol mass Pts. by wt. | Polyol type | Polyol mass Pts. by wt. | Compatibility |
|---|---|---|---|---|---|---|---|
| 7 | cis-BD | 15 | ges-BD | 10 | A | 80 | homo- |

-continued

| Ex. | Diol type 1 | Diol mass Pts. by wt. | Diol type 2 | Diol mass Pts. by wt. | Polyol type | Polyol mass Pts. by wt. | Compatibility |
| --- | --- | --- | --- | --- | --- | --- | --- |
| 8 | 3-BD | 15 | ges-BD | 10 | A | 80 | geneous homogeneous |

The following Examples show that polyol components which form storage-stable mixtures both at elevated temperatures and at reduced temperatures can be formulated with the unsaturated chain lengthening agents.

EXAMPLE 9

Polyol mixture:
100.0 parts by weight of polyol B
25.0 parts by weight of cis-BD
2.5 parts by weight of $H_{12}$-MDA The mixture shows no signs of separation after 5 weeks' storage at 6° C. or after 2 weeks' storage at 50° C.

EXAMPLE 10

Polyol mixture:
100.0 parts by weight of Polyol B
15.0 parts by weight of cis-BD
10.0 parts by weight of ges-BD
2.5 parts by weight of $H_{12}$-MDA The mixture shows no signs of separation after 5 weeks' storage at 6° C. or after 2 weeks' storage at 50° C.

EXAMPLE 11

Polyol mixture:
100.0 parts by weight of Polyol C
15.0 parts by weight of cis-BD
10.0 parts by weight of ges-BD
2.5 parts by weight of $H_{12}$-MDA The mixture shows no signs of separation after 5 weeks' storage at 6° C. or 2 weeks' storage at 50° C.

The following Examples show that adhesives which attain a high level of adhesive properties and in which the polyol component is stable against separation can be formulated with the unsaturated chain lengthening agents.

To test the combined tension and shear resistance according to DIN 53 283, single lap shear specimen were prepared from the synthetic resin material which is to be bonded. The thickness of the adhesive joint was 0.8 mm unless otherwise indicated, the width of the test sample was 20 mm, and the thickness of the test sample was 4 nun (Baydur STR 3 mm, available from Bayer AG), and the overlapping length was 10 mm. The combined tension and shear resistance recorded is an average value obtained from 5 samples. The parts joined together were not subjected to any special preliminary treatment. Baydur STR was abraded with sandpaper.

EXAMPLE 12

Joined parts: Unsaturated, glass fiber reinforced polyester resin (SMC)
Curing conditions: 20 min at 140° C. (laboratory circulating oven)
Thickness of adhesive joint: 0.15 mm
Polyol component:
100.0 parts by weight of Polyol F
15.0 parts by weight of cis-BD
5.0 parts by weight of $H_{12}$-MDA
6.0 parts by weight of zeolite paste
Isocyanate component: 100.7 parts by weight of crude MDI
The lap shear strength was 9.1N/mm².

EXAMPLE 13

Joined parts: A polycarbonate-ABS blend containing 85% of polycarbonate
Curing conditions: 24 h at room temperature
Polyol component:
127.5 parts by weight of the polyol mixture from Example 10
6.0 parts by weight of zeolite paste
0.39 parts by weight of Cat. 1
The polyol component obtained was kept at −20° C. for 14 days and its temperature was then raised to room temperature. No signs of separation were found. The polyol component was then mixed with the isocyanate component. Isocyanate component: 100.0 parts by weight of crude MDI
The lap shear strength at room temperature was 6.2 N/mm² the fracture-surface showed complete failure of the joined parts.

EXAMPLE 14

Joined parts: A polycarbonate-ABS blend having a polycarbonate content of 85%
Curing conditions:
24 h at room temperature Polyol component:
127.5 parts by weight of the polyol mixture from Example 10
6.0 parts by weight of zeolite paste
0.39 parts by weight of Cat. 1.
The polyol component obtained was stored at 50° C. for 14 days and then cooled to room temperature. No signs of separation were found. The polyol component was then mixed with the isocyanate component.
Isocyanate component: 100.0 parts by weight of crude MDI
The lap shear strength at room temperature was 8.3 N/mm² the fracture-surface showed complete failure of the joined parts.
The combined tension and shear resistance at 85° C. was 5.9 N/mm² the fracture-surface showed complete failure of the joined parts.

EXAMPLE 15

Joined parts: A PUR-RII4 of the type Baydur STR 1300 (density 1000 kg/m³, 10 Vol.−% of glass)
Curing conditions: 24 h at room temperature
Polyol component:
127.5 parts by weight of the polyol mixture from Example 10
6.0 parts by weight of zeolite paste
0.39 parts by weight of Cat.1.
The polyol component obtained was stored at 50° C. for 4 days and then cooled to room temperature. No signs of separation were found. The polyol component was then mixed with the isocyanate component.
Isocyanate component: 100.0 parts by weight of crude MDI.
The lap shear strength at −40° C. was 12.0 N/mm² the fracture-surface showed complete failure of the joined parts.

EXAMPLE 16

Joined parts: A PUR-RIM of the type of Baydur STR 1300

(Density: 1000 kg/m³, 10 Vol.—% of glass)
Curing conditions: 24 h at room temperature
Polyol component:
127.5 parts by weight of the polyol mixture from Example 10
6.0 parts by weight of zeolite paste
0.39 parts by weight of Cat.1.

The polyol component obtained was stored at $-20°$ C. for 4 days and its temperature was then raised to room temperature. No signs of separation were found. The polyol component was then mixed with the isocyanate component. Isocyanate component: 100.0 parts by weight of crude MDI The bonded test samples were stored in water at a temperature of 60C. for 14 days. The lap shear strength was then found to be 10.9 N/mm² at $-40°$ C., the fracture-surface showed complete failure of the joined parts.

EXAMPLE 17

Polyol mixture:
100.0 parts by weight of Polyol B
40.0 parts by weight of cis-BD
5.0 parts by weight of H$_{12}$-MDA The mixture remains flowable after 2 weeks' storage at 6° C. and shows no signs of separation.

Joined parts: Unsaturated, glass fiber reinforced polyester resin (SMC)

Curing conditions: 20 min at 140° C. (laboratory circulating oven)

A polyol component obtained from the above-mentioned polyol mixture with the addition of 6.0 parts by weight of zeolite paste is mixed with 152.4 parts by weight of crude MDI.

The lap shear strength was 6.2 N/mm², the fracture-surface showed complete failure of the joined parts.

EXAMPLE 18

Polyol mixture:
100.0 parts by weight of Polyol B
30.0 parts by weight of cis-BD
10.0 parts by weight of ges-BD
5.0 parts by weight of H$_{12}$-MDA The mixture remains flowable after 2 weeks' storage at 6° C. and shows no signs of separation.

Joined parts: Unsaturated, glass fiber reinforced polyester resin (SMC)

Curing conditions: 20 min at 140° C. (laboratory circulating air oven)

A polyol component obtained from the above mentioned polyol mixture with the addition of 6.0 parts by weight of zeolite paste is mixed with 152.4 parts by weight of crude MDI.

The lap shear strength was 7.4 N/mm² the fracture-surface showed complete failure of the joined parts.

EXAMPLE 19

Polyol mixture:
100.0 parts by weight of Polyol C
30.0 parts by weight of cis-BD
2.5 parts by weight of H$_{12}$-MDA The mixture remains flowable after 2 weeks' storage at 6° C. and shows no signs of separation. It still shows no signs of separation after storage at a temperature of 50° C. for weeks.

Joined parts: Unsaturated glass fiber reinforced polyester resin (SMC)

Curing conditions: 20 min at 140° C. (laboratory circulating air oven)

A polyol component obtained from the above-mentioned polyol mixture with the addition of 0.3 parts by weight of Cat.1 and 6.0 parts by weight of zeolite paste is mixed with 118.5 parts by weight of crude MDI.

The lad shear strength at room temperature was 5.6 N/mm².

What is claimed is:

1. A two-component polyurethane consisting essentially of an isocyanate component a), an active hydrogen containing component which is stable against demixing b), optionally a catalyst for the reaction of a) with b) and optionally an auxiliary agent and an additive, characterized in that the active hydrogen containing component which is stable against demixing b) contains a hydroxyl group-containing low molecular weight chain lengthening agent having a C—C double bond or C—C triple bond and having a molecular weight of at least 86 to 400 and a functionality of at least 2 and containing no carboxyl groups.

2. A two-component polyurethane according to claim 1, characterized in that component b) contains the following components:
    b1) 100 parts by weight of at least one hydroxyl group-containing compound having a molecular weight of at least 400 and a hydroxyl functionality of at least 2,
    b2) from 2 to 20 parts by weight of at least one aliphatic, aromatic or cycloaliphatic diamine or triamine having a molecular weight of at least 60,
    b3) 5–40 parts by weight of at least one hydroxyl group-containing low molecular weight chain lengthening agent having at least one C—C double bond or C—C triple bond, a molecular weight of at least 86 and a functionality of at least 2 and containing no carboxyl groups, and
    b4) from 0 to 35 parts by weight of at least one hydroxyl group-containing, low molecular weight chain lengthening agent having a molecular weight of at least 62 and a functionality of at least 2.

3. An adhesive containing a two-component polyurethane as recited in claim 1.

4. An adhesive containing a two-component polyurethane as recited in claim 2.

* * * * *